March 28, 1939.　　　　　D. R. KING　　　　　2,151,704
DEVICE FOR ARRESTING THE MOTION OF VEHICLES
Filed March 19, 1938　　　2 Sheets-Sheet 1
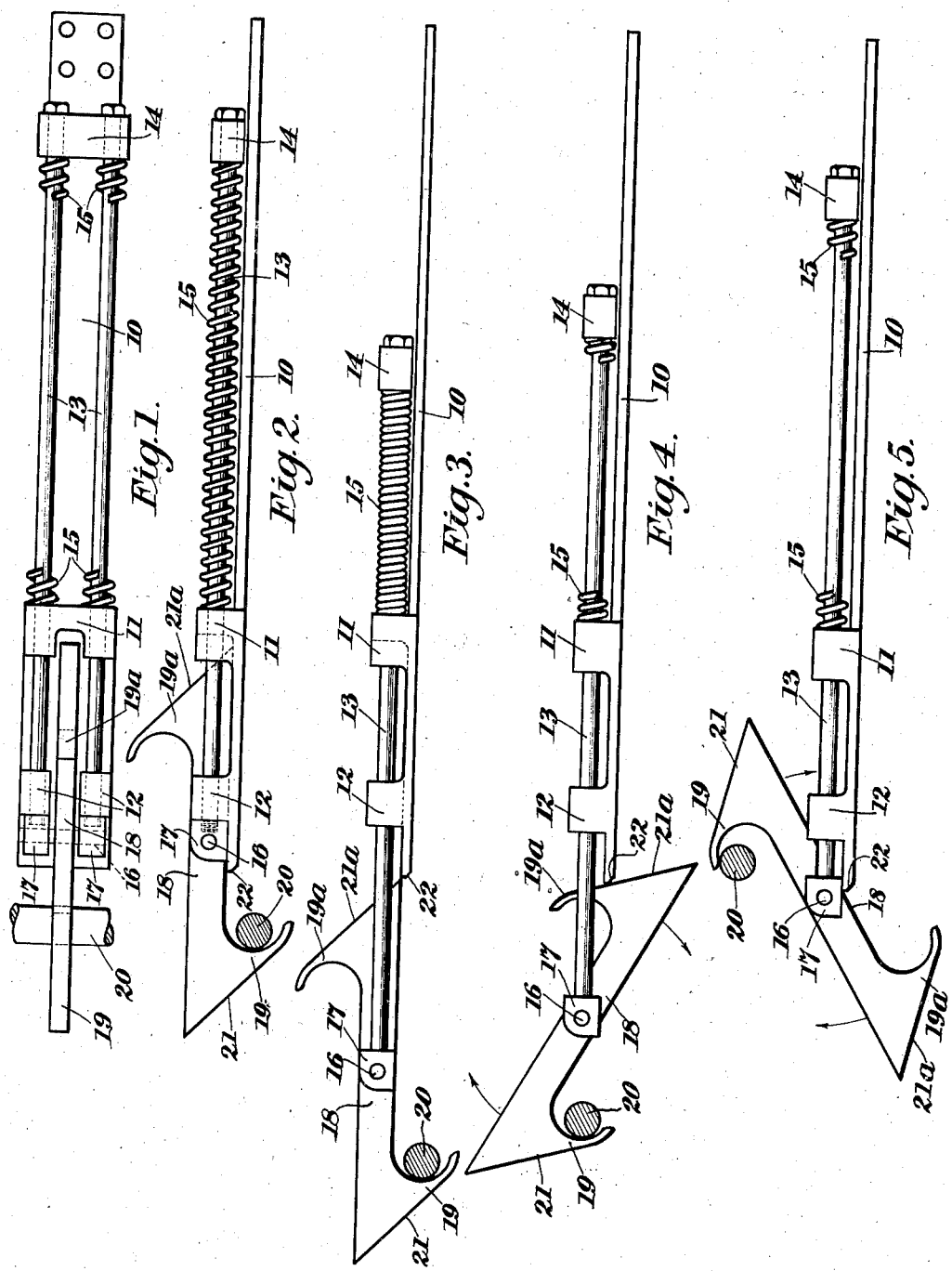
INVENTOR
*Denver R. King*
BY
*Ransom K. Davis*
ATTORNEY March 28, 1939.　　　　D. R. KING　　　　2,151,704
DEVICE FOR ARRESTING THE MOTION OF VEHICLES
Filed March 19, 1938　　　2 Sheets-Sheet 2
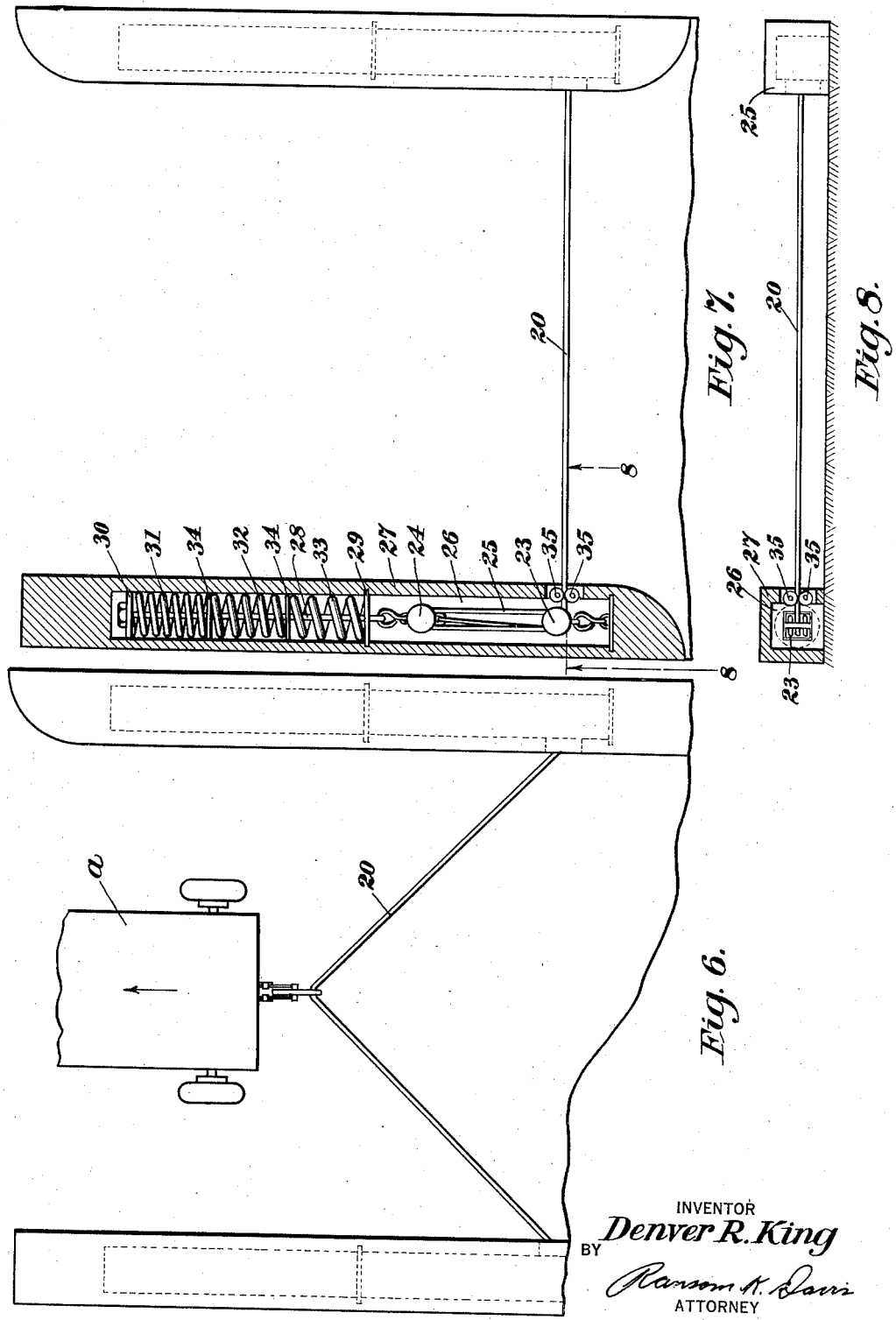
INVENTOR
Denver R. King
BY
Ransom K. Davis
ATTORNEY Patented Mar. 28, 1939

2,151,704

UNITED STATES PATENT OFFICE 2,151,704

DEVICE FOR ARRESTING THE MOTION OF VEHICLES

Denver R. King, United States Navy

Application March 19, 1938, Serial No. 196,897

8 Claims. (Cl. 188—32)

(Granted under the act of March 3, 1883, as amended April 30, 1928; 370 O. G. 757)

This invention relates to devices for arresting the motion of vehicles and it has a particular relation to devices including a hook carried by the vehicle for engagement with a rope or cable stretched across the path of travel of the vehicle.

One of the objects of the present invention is the provision of a device, of the character described, which embodies a pair of hooks, one of which is disposed in a position for engagement with an arresting cable and the other in an inoperative position, the construction and arrangement of the parts being such that as soon as the motion of the vehicle ceases the hook will automatically be released and the positions of the hooks reversed, thus resetting the device for a subsequent operation.

Another object of the invention is the provision of an arresting device, of the type indicated, which is of simple and rugged construction and one which may be installed with a minimum of time and labor.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a plan view of an arresting device embodying the invention;

Fig. 2 is a side elevational view of the structure shown in Fig. 1;

Fig. 3 is a similar view of the device after engagement with the arresting cable;

Fig. 4 is a similar view showing the position of the parts after the motion of the vehicle has been arrested and just prior to the release of the cable;

Fig. 5 is a similar view showing the position of the parts after the cable is released;

Fig. 6 is a diagrammatic plan view of the vehicle arresting instrumentalities installed on a highway;

Fig. 7 is a similar view with certain parts shown in horizontal section; and

Fig. 8 is a transverse sectional view taken on line 8—8 of Fig. 7.

Referring to the drawings, a vehicle arresting device constructed in accordance with the invention, is shown as comprising a support 10 in the form of a plate which is adapted to be secured to the chassis of a vehicle, indicated diagrammatically at $a$ in Fig. 6. The support 10 is provided with a pair of forward and rear guide lugs 11 and 12 respectively, in which two parallel rods 13 are slidably mounted. The forward ends of the rods 13 are connected by a cross bar 14 and are urged forwardly by coil springs 15 surrounding the rods between the guide lug 11 and the cross bar 14. The rear ends of the rods 13 are connected by a pin 16 which is fixed at its ends in blocks 17 secured to the rods. A bar 18 is rotatably mounted intermediate its end upon the pin 16 between the blocks 17 and is formed at its ends with oppositely extending hooks 19 and 19$^a$ for successive engagement with an arresting cable 20, in a manner to be described. These hooks are formed with inclined or cam surfaces 21 and 21$^a$ which at times engage a beveled rear end 22 of the support 10.

Normally, the parts hereinabove described occupy the positions shown in Figs. 1 and 2 in which the springs 15 yieldably hold the bar 18 above and in engagement with the upper surface of the supporting plate 10. In this position the pin 16 is disposed above the support 10 and forward of the rear beveled edge 22 thereof so as to prevent any pivoted movement of the bar 18 and maintaining the hook 19 in an overhanging cable engaging position. As soon, however, as the vehicle passes over the cable 20 and the hook 19 engages the cable, tension is exerted upon the rods 13 sufficient to draw them rearwardly against the action of the springs 15 until the end of the hook 19$^a$ snaps over the rear beveled edge 22 of the support 10 to the position shown in Fig. 4, in which the cam surface 21$^2$ engages or is in a position to engage the beveled edge 22 of the support. This movement, however, is not sufficient to disengage the hook 19 from the cable. When tension is relieved, due to the stoppage of the vehicle, the springs 15 force the rods 13 forwardly and the camming action of the surface 21$^a$ of the hook 19$^a$ against the beveled edge 22 swings the hooks around the pivot pin 16 in the direction of the arrows, thereby disengaging the hook 19 from the cable 20 and carrying the bar 18 and hooks 19 and 19$^a$ back to a position over the support 10 in which the positions of the hooks 19 and 19a are reversed. The device is thus automatically reset for a subsequent cable engaging operation.

The arresting cable 20, referred to above, is stretched across a highway near an intersection or other danger point where vehicles should be compelled to stop and at such distance above the highway that the wheels of the vehicle can pass thereover and yet be engaged by the hooks on the vehicle. The cable 20 should be so connected at its ends as to resiliently yield after engagement by the vehicle and have sufficient give to bring the vehicle to a stop within a given distance without undue suddenness or shock. This is accomplished by passing each end of the cable 20 several times around the sheaves of pulleys 23 and 24 of a block and tackle 25 disposed within a compartment 26 formed in a curbing or other structure 27 located at one side of the highway. The pulley 23 of the block and tackle is fixed to one end wall of the compartment 26 and the other pulley 24 thereof is fixed to one end of a rod 28 which passes through a partition 29 anchored in the walls of the compartment and which is provided at its other end with a cross plate or collar 30. Coil springs 31, 32 and 33 of increasing strength surround the rod 28 between the partition 29 and the collar 30 and are separated by disks or washers 34. Sheaves 35 are disposed on each side of the cable 20 where it enters the compartment 26 to absorb lateral strain and to insure smoothness of operation when the cable is flexed through engagement by a vehicle, as shown in Fig. 6. Thus, it will be seen that if the vehicle is travelling at a moderate rate of speed when it engages the cable 20, the relatively light springs 31 will absorb most of the strain without compressing the stronger springs 32 and 33 any appreciable amount but in the event that the vehicle is moving at higher speeds, the strain is successively transmitted to these stronger springs to provide increasing resistance.

From the foregoing it will be apparent that a very simple and efficient vehicle arresting device is provided and one which will bring a vehicle to a gradual stop without undue discomfort to the occupants. Also, it will be noted that the device automatically resets itself for another arresting operation after its release from the arresting cable.

The herein described device may be modified in proportion and arrangement of the parts by those skilled in the art without departing from the nature and scope of the invention as defined in the appended claims.

The invention described herein may be manufactured and/or by or for the Government of the United States of America for governmental purposes without the payment of any royalties thereon or therefor.

I claim:

1. A device for arresting the motion of a vehicle comprising a hook for connection with a vehicle and adapted to engage a cable stretched across the path of travel of the vehicle, and latch mechanism operable when the force exerted by the cable on the hook decreases through the stoppage of the vehicle, for disengaging said hook from said cable.

2. A device for arresting the motion of a vehicle comprising two hooks adapted to be connected with a vehicle, means for releasably holding one of said hooks in a position to engage a cable stretched across the path of travel of the vehicle and the other of said hooks in an inoperative position; and means operable when the force exerted on the cable engaging hook decreases through the stoppage of the vehicle for disengaging said first mentioned hook from said cable and moving said second mentioned hook to a cable engaging position.

3. A device for arresting the motion of a vehicle comprising a support; a pair of hooks movably mounted on said support, one of said hooks being disposed in a position to engage a cable stretched across the path of travel of the vehicle and the other of said hooks being disposed in an inoperative position; and means operable when the force exerted on the cable engaging hook decreases through the stoppage of the vehicle for disengaging said first mentioned hook from said cable and for interchanging the positions of said hooks.

4. A device for arresting the motion of a vehicle comprising a support adapted to be secured to a vehicle, a pair of oppositely extending hooks pivotally mounted on said support, one of said hooks being disposed in a position to engage a cable stretched across the path of travel of the vehicle and the other of said hooks being disposed in an inoperative position; and means operable when the force exerted on the cable engaging hook decreases through the stoppage of the vehicle for disengaging the first mentioned hook from the cable and reversing the positions of said hooks.

5. A device for arresting the motion of a vehicle comprising a support adapted to be secured to a vehicle; sliding means mounted on said support; a pair of oppositely extending hooks pivotally mounted on said sliding means; and spring means for urging said sliding means toward a position in which said hooks are prevented from rotating thereon by engagement with said support and in which one of said hooks is held in a position to engage a cable stretched across the path of travel of the vehicle and the other of said hooks is held in an inoperative position, said spring means permitting said sliding means to be moved to a position in which said hooks are out of engagement with said support when force is applied on the hook through engagement with the cable and returning said sliding means to its initial position when such force decreases through the stoppage of the vehicle, the returning movement of said sliding means disengaging the first mentioned hook from said cable and reversing the positions of said hooks when such disengagement is effected.

6. A device for arresting the motion of a vehicle comprising a support adapted to be secured to a vehicle; sliding means mounted on said support; a bar pivoted intermediate its ends on said slide; a hook provided at each end of said bar on opposite sides thereof; and spring means for urging said sliding means toward a position in which the side of said bar is in engagement with said support and is prevented from rotating thereby, for holding one of said hooks in a position to engage a cable stretched across the path of travel of the vehicle and the other of said hooks in an inoperative position, said spring means permitting said sliding means to be moved to a position in which said bar is out of engagement with said support when force is applied on the hook through engagement with the cable and returning said sliding means to its initial position when such force decreases through the stoppage of the vehicle, the returning movement of said sliding means disengaging the first mentioned hook from said cable and reversing the positions of said hooks when such disengagement is effected.

7. A device for arresting the motion of a vehicle comprising a support adapted to be secured to a vehicle; sliding means mounted on said support; a bar pivoted intermediate its ends on said slide; a hook provided at each end of said bar on opposite sides thereof; and spring means for urging said slide toward a position in which said bar and hooks are prevented from rotating thereon by engagement with said support and in which one of said hooks is held in a position to engage a cable stretched across the path of travel of said vehicle and the other hook is held in an inoperative position, said spring means permitting said sliding means to be moved to a position in which said bar and hooks are out of engagement with said support when force is applied on the hook through engagement with the cable and returning said sliding means to its initial position when such force decreases through the stoppage of the vehicle, the returning movement of said sliding means disengaging the first mentioned hook from said cable and carrying said bar against the end of said support to rotate said bar and reverse the positions of said hooks when such disengagement is effected.

8. A device for arresting the motion of a vehicle comprising a support adapted to be secured to a vehicle; sliding means mounted on said support; a pair of oppositely extending hooks pivotally mounted on said slide and each having a cam surface; and spring means for urging said sliding means toward a position in which said hooks are prevented from rotating thereon by engagement with said support and in which one of said hooks is held in a position to engage a cable stretched across the path of travel of the vehicle, and the other of said hooks is held in an inoperative position, said spring means permitting said sliding means to be moved to a position in which said hooks are out of engagement with said support when force is applied on the hook through engagement with the cable and returning said sliding means to its initial position when such force is removed through the stoppage of the vehicle, the returning movement of said sliding means disengaging the first mentioned hook from said cable and carrying the cam surface of the second mentioned hook into engagement with the end of said support to rotate said hooks and reverse their positions when such disengagement is effected.

DENVER R. KING.